United States Patent
Suito et al.

(10) Patent No.: US 9,650,554 B2
(45) Date of Patent: May 16, 2017

(54) LATENT HEAT STORAGE MATERIAL

(71) Applicant: Panasonic Corporation, Osaka (JP)

(72) Inventors: Kazuaki Suito, Saitama (JP); Motohiro Suzuki, Osaka (JP); Hironobu Machida, Nara (JP); Shinsuke Takeguchi, Osaka (JP); Kentaro Shii, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 15/216,663

(22) Filed: Jul. 21, 2016

(65) Prior Publication Data

US 2017/0037292 A1    Feb. 9, 2017

(30) Foreign Application Priority Data

Aug. 6, 2015    (JP) ................... 2015-156356

(51) Int. Cl.
    *C09K 5/00*    (2006.01)
    *C09K 5/06*    (2006.01)

(52) U.S. Cl.
    CPC ........... *C09K 5/063* (2013.01); *C09K 5/00* (2013.01)

(58) Field of Classification Search
    CPC ............ C09K 5/00; C09K 5/06; C09K 5/063
    USPC ......................................... 252/76
    See application file for complete search history.

(56) References Cited

U.S. PATENT DOCUMENTS

| | | | |
|---|---|---|---|
| 4,595,516 A * | 6/1986 | Wada | C09K 5/063 252/70 |
| 4,849,121 A | 7/1989 | Dinter | |
| 2008/0011978 A1* | 1/2008 | Kawaguchi | C09K 5/10 252/69 |
| 2009/0211726 A1* | 8/2009 | Bank | C09K 5/063 165/10 |
| 2016/0090520 A1* | 3/2016 | Suzuki | F28D 20/0034 165/10 |

FOREIGN PATENT DOCUMENTS

| | | | | |
|---|---|---|---|---|
| JP | 58-093779 | | 6/1983 | |
| JP | 59093780 A | * | 5/1984 | ............... C09K 5/06 |
| JP | 60163988 A | * | 8/1985 | ............... C09K 5/00 |
| JP | 62-070480 | | 3/1987 | |
| JP | 63-230784 | | 9/1988 | |
| JP | 63-256683 | | 10/1988 | |
| JP | 63256683 A | * | 10/1988 | ............... C09K 5/06 |
| JP | 4-324092 | | 11/1992 | |
| JP | 2012-007796 | | 1/2012 | |

OTHER PUBLICATIONS

English abstract JP 63256683 A, Saito et al., published Oct. 1988.*
English abstract JP 60163988 A, Komeno et al., published Aug. 1985.*
English abstract JP 59093780 A, Kimura et al., published May 1984.*

* cited by examiner

*Primary Examiner* — Jane L Stanley
(74) *Attorney, Agent, or Firm* — McDermott Will & Emery LLP

(57) ABSTRACT

A latent heat storage material contains sodium acetate, water, and a supercooling stabilizer containing a group 11 metal-containing compound, and has a group 11 metal concentration of $2.0 \times 10^5$ ppm or less.

3 Claims, 2 Drawing Sheets

LATENT HEAT STORAGE MATERIAL

BACKGROUND

1. Technical Field

The present disclosure relates to a latent heat storage material.

2. Description of the Related Art

Use of heat storage materials is considered as one of the methods for effective utilization of thermal energy. Among heat storage materials, latent heat storage materials, which work by taking advantage of the phase change of materials, are advantageous in that they have a relatively high heat storage density and can maintain a constant temperature at which the phase change occurs. Among latent heat storage materials, sodium acetate trihydrate is considered to be suitable for various applications because it has a relatively large amount of latent heat of fusion and is non-toxic. For example, PTL 1 discloses a system in which sodium acetate trihydrate is used as a heat storage material. This conventional technique uses heat absorbed and released by phase change at or near melting point. On the other hand, there is also proposed a method for utilizing heat in a temperature zone lower than melting point. Specifically, in such a method, an aqueous sodium acetate solution as a heat storage material, resulting from dissolution of sodium acetate due to exhaust heat, stores heat when it is in what is called a supercooled state, where the solution maintains its liquid state even at a temperature lower than its melting point, and when necessary, a trigger is applied to the heat storage material, so that the heat storage material begins to crystallize and generate heat.

There are proposed heat storage material compositions capable of having improved stability of supercooled state for use in heat storage methods using a supercooled state as mentioned above. For example, PTL 2 discloses that when an aqueous caramel sugar solution or the like is added to sodium acetate trihydrate, the resulting heat storage material composition can stably maintain a supercooled state. PTL 3 discloses that when 10 wt % to 30 wt % of pure water is added to sodium acetate trihydrate, the resulting heat storage material composition can have a stabilized supercooled state in a low-temperature environment at −13° C. or lower.

Some applications or environments for systems using a heat storage material composition require the heat storage material composition to be capable of stably maintaining a supercooled state even in an environment at a temperature lower than room temperature (low-temperature environment).

CITATION LIST

Patent Literatures

PTL 1: Unexamined Japanese Patent Publication No. 2012-007796

PTL 2: Unexamined Japanese Patent Publication No. S62-70480

PTL 3: Unexamined Japanese Patent Publication No. H04-324092

SUMMARY

In one general aspect, the techniques disclosed here feature a latent heat storage material that includes sodium acetate, water, and a supercooling stabilizer containing a group 11 metal-containing compound, and has a group 11 metal concentration of $2.0 \times 10^5$ ppm or less.

The latent heat storage material of the present disclosure can stably maintain its supercooled state even in an environment at a temperature lower than room temperature (low-temperature environment).

DETAILED DESCRIPTION

Figure 1:
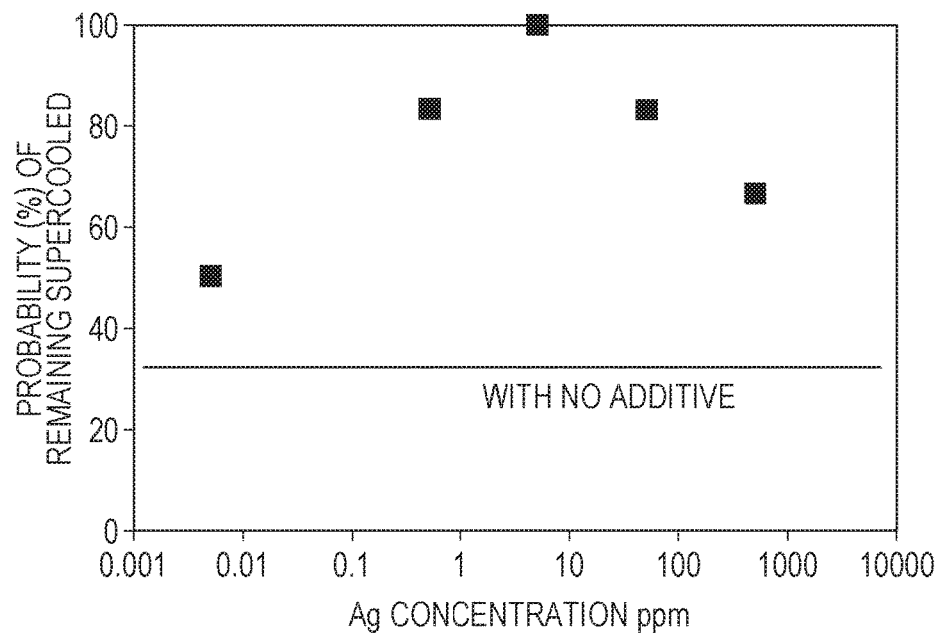
FIG. 1 is a graph showing a relationship between the probability (%) of a latent heat storage material according to the present disclosure remaining supercooled at −20° C. and the total silver concentration (ppm) of the latent heat storage material.

In order to solve the conventional problems, an object of the present disclosure is to provide a novel latent heat storage material capable of stably maintaining its supercooled state even in a low-temperature environment.

In conventional techniques, the improvement of the stability of the supercooled state at low temperature requires adding more than 1 wt % of an additive, which sometimes reduces the heat storage density.

Another object of the present disclosure is to provide a latent heat storage material that can work even when its additive content is 1 wt % or less so that a reduction in heat storage density can also be suppressed.

A first aspect of the present disclosure provides a latent heat storage material that includes sodium acetate, water, and a supercooling stabilizer containing a group 11 metal-containing compound, and has a group 11 metal concentration of $2.0 \times 10^5$ ppm or less.

The latent heat storage material of the first aspect contains a specific amount of a group 11 metal, which can be hydrated with a sufficient amount of water molecules in the latent heat storage material. This significantly reduces the probability of formation of nuclei (crystal nuclei) and increases the probability of inhibition of crystallization. Therefore, the latent heat storage material of the first aspect can stably maintain its supercooled state even in a low-temperature environment (e.g., at −20° C.). In other words, the latent heat storage material of the first aspect can have a higher probability of remaining supercooled at −20° C. than a latent heat storage material containing only sodium acetate and water. The latent heat storage material of the first aspect can also stably maintain its supercooled state even in a low-temperature environment (e.g., at −20° C.) while maintaining a high heat storage density.

A second aspect of the present disclosure provides a latent heat storage material having the features of the first aspect, in which the group 11 metal is, for example, silver or copper. According to the second aspect, the probability of formation of crystal nuclei caused by aggregation of silver or copper itself is significantly reduced, so that the probability of inhibition of crystallization is increased. Therefore, the latent heat storage material of the second aspect can stably maintain its supercooled state even in a low-temperature environment (e.g., at −20° C.).

A third aspect of the present disclosure provides a latent heat storage material having the features of the second aspect and also having a silver concentration of, for example, $1.0 \times 10^5$ ppm or less.

According to the third aspect, the probability of formation of crystal nuclei caused by aggregation of silver itself is significantly reduced, so that the probability of inhibition of crystallization is increased. Therefore, the latent heat storage material of the third aspect can have a higher probability of remaining supercooled at −20° C.

A fourth aspect of the present disclosure provides a latent heat storage material having the features of the second aspect, in which the group 11 metal-containing compound is, for example, silver(I) nitrate, and also having a silver concentration between $5.0 \times 10^3$ ppm and $2.0 \times 10^3$ ppm (both inclusive). According to the fourth aspect, silver can be hydrated with a sufficient amount of water molecules in the latent heat storage material. This significantly reduces the probability of formation of crystal nuclei caused by aggregation of silver itself and increases the probability of inhibition of crystallization. Therefore, the latent heat storage material of the fourth aspect can have a higher probability of remaining supercooled at −20° C.

A fifth aspect of the present disclosure provides a latent heat storage material having the features of the second aspect, in which the group 11 metal-containing compound is, for example, silver(I) oxide, and also having a silver concentration between 40 ppm and $1.0 \times 10^5$ ppm (both inclusive). According to the fifth aspect, silver can be hydrated with a sufficient amount of water molecules in the latent heat storage material, This significantly reduces the probability of formation of crystal nuclei caused by aggregation of silver itself and increases the probability of inhibition of crystallization. Therefore, the latent heat storage material of the fifth aspect can have a higher probability of remaining supercooled at −20° C.

A sixth aspect of the present disclosure provides a latent heat storage material having the features of the second aspect and also having a copper concentration of, for example, $2.0 \times 10^5$ ppm or less.

According to the sixth aspect of the present disclosure, the probability of formation of crystal nuclei caused by aggregation of copper itself is significantly reduced, so that the probability of inhibition of crystallization is increased. Therefore, the latent heat storage material of the sixth aspect can have a higher probability of remaining supercooled at −20° C. In the latent heat storage material of the sixth aspect, where copper is used at a concentration in the specified range, the copper with a hydration number of 6 can be hydrated with a larger amount of water molecules than in the case where silver with a hydration number of 2 is used, and thus, the copper can more effectively work to inhibit crystallization. Therefore, even when the copper concentration is lower than that of silver, the latent heat storage material of the sixth aspect can have a higher probability of remaining supercooled at −20° C. than a latent heat storage material containing only sodium acetate and water.

A seventh aspect of the present disclosure provides a latent heat storage material having the features of the second aspect, in which the group 11 metal-containing compound is, for example, copper(II) chloride, and also having a copper concentration between $1.0 \times 10^{-5}$ ppm and $2.0 \times 10^5$ ppm (both inclusive). According to the seventh aspect, copper can be hydrated with a sufficient amount of water molecules in the latent heat storage material. This significantly reduces the probability of formation of crystal nuclei caused by aggregation of copper itself and increases the probability of inhibition of crystallization. Therefore, the latent heat storage material of the seventh aspect can have a higher probability of remaining supercooled at −20° C.

An eighth aspect of the present disclosure provides a latent heat storage material having the features of the second aspect, in which the group 11 metal-containing compound is, for example, copper(II) oxide, and also having a copper concentration between $5.0 \times 10^{-2}$ ppm and $6.0 \times 10^4$ ppm (both inclusive). According to the eighth aspect, copper can be hydrated with a sufficient amount of water molecules in the latent heat storage material. This significantly reduces the probability of formation of crystal nuclei caused by aggregation of copper itself and increases the probability of inhibition of crystallization. Therefore, the latent heat storage material of the eighth aspect can have a higher probability of remaining supercooled at −20° C.

A ninth aspect of the present disclosure provides a latent heat storage material having the features of any one of the first to eighth aspects, in which the concentration of sodium acetate is, for example, between 40 wt % and 58 wt %. According to the ninth aspect, the latent heat storage material can stably maintain its supercooled state even in a low-temperature environment (e.g., at −20° C.).

Hereinafter, exemplary embodiments of the present disclosure will be described with reference to the drawings. It will be understood that the description below is only by way of example and is not intended to limit the present disclosure.

A latent heat storage material of an exemplary embodiment contains sodium acetate, water, and a supercooling stabilizer, in which the supercooling stabilizer contains a group 11 metal-containing compound, and the concentration (weight concentration) of the group 11 metal is $2.0 \times 10^5$ ppm or less.

The weight ratio R of the sodium acetate to the water (sodium acetate/water) may be 57/43 or less, preferably 56/44 or less.

The group 11 metal in the group 11 metal-containing compound is preferably silver or copper, which is highly effective in stabilizing the supercooled state. When the group 11 metal-containing compound is used, the probability of formation of crystal nuclei caused by aggregation of the group 11 metal itself is significantly reduced, and the probability of inhibition of crystallization is increased, so that the probability that the latent heat storage material remains supercooled at −20° C. can be increased in the above concentration range.

The supercooling stabilizer may contain an additional supercooling stabilizer component other than the group 11 metal-containing compound. Besides the group 11 metal-containing compound, the latent heat storage material may contain a single additional supercooling stabilizer or two or more additional supercooling stabilizers.

In the latent heat storage material of an exemplary embodiment, the supercooling stabilizer may contain only the group 11 metal-containing compound.

In the latent heat storage material of an exemplary embodiment, the group 11 metal may be silver, namely, the group 11 metal-containing compound may be a silver-containing compound. In this case, the silver-containing compound may be, for example, silver(I) oxide ($Ag_2O$), silver(II) oxide (AgO), silver(I) nitrate ($AgNO_3$), silver nitrite, silver sulfate, silver sulfite, silver carbonate ($Ag_2CO_3$), silver sulfide, silver borate, silver oxalate, silver cyanide, silver oxide-cyanide, silver lactate, silver fluoride, silver trifluoroacetate, silver bromide, silver acetate, silver butyrate, silver citrate, silver permanganate ($Ag_2MnO_4$), silver benzoate, silver butyrate, silver cinnamate, silver picrate, silver salicylate, silver tartrate, or silver phthalocyanine.

When the group 11 metal is silver in the latent heat storage material of an exemplary embodiment, the concentration of silver in the latent heat storage material is preferably $1.0 \times 10^5$ ppm or less.

When the silver-containing compound is silver(I) nitrate, the concentration of silver in the latent heat storage material is preferably between $5.0 \times 10^{-3}$ ppm and $2.0 \times 10^3$ ppm (both inclusive), more preferably between $8.0 \times 10^{-2}$ ppm and $1.0 \times 10^2$ ppm (both inclusive), even more preferably between $5.0 \times 10^{-1}$ ppm and 40 ppm (both inclusive).

When the silver-containing compound is silver(I) oxide, the concentration of silver in the latent heat storage material is preferably between 40 ppm and $1.0 \times 10^5$ ppm (both inclusive), more preferably between 55 ppm and $5.0 \times 10^4$ ppm (both inclusive), even more preferably between 75 ppm and $4.6 \times 10^4$ ppm (both inclusive).

In the latent heat storage material of the present disclosure, the group 11 metal may be copper, namely, the group 11 metal-containing compound may be a copper-containing compound. In this case, the copper-containing compound may be, for example, copper(II) chloride ($CuCl_2$), copper(I) oxide ($Cu_2O$), copper(II) oxide (CuO), copper nitrate, copper sulfate, copper sulfide, copper carbonate, copper acetate, or copper phthalocyanine.

When the group 11 metal is copper in the latent heat storage material of an exemplary embodiment, the concentration of copper in the latent heat storage material is preferably $2.0 \times 10^5$ ppm or less.

When the copper-containing compound is copper(II) chloride, the concentration of copper in the latent heat storage material is preferably between $1.0 \times 10^{-5}$ ppm and $2.0 \times 10^5$ ppm (both inclusive), more preferably between $4.0 \times 10^{-3}$ ppm and $8.0 \times 10^4$ ppm (both inclusive), even more preferably between $4.0 \times 10^{-2}$ ppm and $4.7 \times 10^4$ ppm (both inclusive).

When the copper-containing compound is copper(II) oxide, the concentration of copper in the latent heat storage material is preferably between $5.0 \times 10^{-2}$ ppm and $6.0 \times 10^4$ ppm (both inclusive), more preferably between $5.0 \times 10^{-2}$ ppm and $5.0 \times 10^4$ ppm (both inclusive), even more preferably between $5.0 \times 10^{-2}$ ppm and $4.0 \times 10^4$ ppm (both inclusive).

The concentration of the group 11 metal in the latent heat storage material of an exemplary embodiment can be controlled by controlling the added amount of the group 11 metal-containing compound during the preparation, and can also be controlled using an aqueous sodium acetate solution. The amount of the group 11 metal in the latent heat storage material can be determined, depending on the concentration range, by calculation from the added amount of the group 11 metal-containing compound (in the case of a relatively high concentration) or by calculation from the results of elemental analysis (ICP-MS (inductively coupled plasma mass spectrometry)) of the latent heat storage material (in the case of a relatively low concentration).

The latent heat storage material of an exemplary embodiment may contain any of various known additives as components other than sodium acetate, water, and the supercooling stabilizer. Examples of such additives include viscosity modifiers, foam stabilizers, antioxidants, defoaming agents, abrasive grains, fillers, pigments, dyes, colorants, thickeners, surfactants, flame retardants, plasticizers, lubricants, antistatic agents, heat-resistant stabilizers, tackifiers, curing catalysts, stabilizers, silane coupling agents, waxes, and other known materials. The additives may be of any type and used in any amount as long as the object of the present disclosure is not compromised. The latent heat storage material of the present disclosure may contain only sodium acetate, water, and the supercooling stabilizer.

If necessary, the latent heat storage material of an exemplary embodiment may be subjected to filtration through a desired filter or any other process for removing insoluble components. The pore size of the filter used in this process may be, but not limited to, less than 1.0 μm or less than 0.50 μm, in order to prevent the formation of nuclei. Any type of filter may be used, such as an ion chromatography filter manufactured by GL Sciences Inc. (model: 25AI, pore size: 0.45 μm, catalog number: 5040-28522).

The latent heat storage material of an exemplary embodiment can be prepared by mixing sodium acetate, water, and the supercooling stabilizer.

EXAMPLES

Next, the latent heat storage material of the present disclosure will be more specifically described with reference to examples, which, however, are not intended to limit the present disclosure in any respect.

(Method for Evaluating the Stability of Supercooling at −20° C.)

The latent heat storage material (composition) of each of the examples and the comparative examples was placed and held in a thermostat (instrument name: Compact Ultra-Low Temperature Chamber Mini-Subzero, model: MC-812, manufactured by ESPEC CORP.) at 75° C. for 4 hours and then cooled to 30° C. at a rate of 45° C./h. Subsequently, the latent heat storage material was held at 30° C. for 1 hour, then cooled to −20° C. at a rate of 50° C./h, and held at −20° C. for 12 hours. This operation was performed six times on each composition, in which the number of times where the composition maintained its supercooled state after the storage at −20° C. for 12 hours was measured. The probability of remaining supercooled at 20° C. was defined as the value calculated by dividing the measured number of times by the total number of measurements (six times) and then multiplying the quotient by 100. Whether the supercooled state remained was determined by whether crystal nuclei formed after the storage at −20° C. for 12 hours, which was determined using a thermocouple that was attached to the side surface of the sample vessel to detect the heat of solidification associated with crystallization. The cases (the number of times) where no nuclei formed were evaluated as maintaining the supercooled state.

Comparative Example A1

The stability of supercooling of an aqueous sodium acetate solution consisting of sodium acetate and water was examined.

In a glass sample vial, a composition with a sodium acetate concentration of 55 wt % was prepared, consisting of pure water and sodium acetate trihydrate (analytical grade)

manufactured by Wako Pure Chemical Industries Ltd. In the preparation of the composition, the total weight of sodium acetate and water was 6.6 g. The resulting composition was evaluated by the method described above for evaluating the stability of supercooling. Table 1 shows the result.

Comparative Example A2

A composition containing sodium acetate trihydrate and pure water was prepared by the same method as in Comparative Example A1. In the preparation of the composition, the total weight of sodium acetate and water was 6.6 g, to which $1.1 \times 10^{-1}$ wt % of titanium oxide ($TiO_2$) was added. The resulting mixture was heated at 75° C. to give a latent heat storage material (the concentration of titanium in the latent heat storage material: $1.0 \times 10^2$ ppm). Crystallization occurred every time the method for evaluating the stability of supercooling was performed, and it was not possible to evaluate the stability of supercooling.

Comparative Example A3

A composition containing sodium acetate trihydrate and pure water was prepared by the same method as in Comparative Example A1. In the preparation of the composition, the total weight of sodium acetate and water was 6.6 g, to which 4.8 wt % of aluminum oxide ($Al_2O_3$) was added. The resulting mixture was heated at 75° C. to give a latent heat storage material (the concentration of aluminum in the latent heat storage material: $3.5 \times 10^3$ ppm). Crystallization occurred every time the method for evaluating the stability of supercooling was performed, and it was not possible to evaluate the stability of supercooling.

Comparative Example A4

A composition containing sodium acetate trihydrate and pure water was prepared by the same method as in Comparative Example A1. In the preparation of the composition, the total weight of sodium acetate and water was 6.6 g, to which $6.5 \times 10^{-3}$ wt % of iron(II) oxide ($Fe_2O_3$) was added. The resulting mixture was heated at 75° C. to give a latent heat storage material (the concentration of iron in the latent heat storage material: 6.0 ppm). Crystallization occurred every time the method for evaluating the stability of supercooling was performed, and it was not possible to evaluate the stability of supercooling.

Comparative Example A5

A composition containing sodium acetate trihydrate and pure water was prepared by the same method as in Comparative Example A1. In the preparation of the composition, the total weight of sodium acetate and water was 6.6 g, to which $4.5 \times 10^{-2}$ wt % of silicon dioxide ($SiO_2$) was added. The resulting mixture was heated at 75° C. to give a latent heat storage material (the concentration of silicon in the latent heat storage material: $3.0 \times 10$ ppm). Crystallization occurred every time the method for evaluating the stability of supercooling was performed, and it was not possible to evaluate the stability of supercooling.

As described below, latent heat storage materials containing different types of additives or having different composition ratios were prepared as examples, with which a study was conducted on the relationship between the composition (weight percent concentration) of silver or copper, water, and sodium acetate and the stability of supercooling of the latent heat storage materials.

Example B1

A study was conducted on how the addition of silver(I) nitrate to a sodium acetate solution containing sodium acetate as a main component had an effect on the stability of supercooling. Specifically, the following procedure was carried out.

In a glass sample vial, a composition with a sodium acetate concentration of 55 wt % was prepared, the composition containing pure water and sodium acetate trihydrate (analytical grade) manufactured by Wako Pure Chemical Industries Ltd. In the preparation of the composition, the total weight of sodium acetate and water was 6.6 g, to which 1 wt % of silver nitrate was added. After the resulting mixture was heated at 75° C., insoluble components were removed from the mixture using a filter with a pore size of 0.45 µm (model: 25AI, catalog number: 5040-28522, manufactured by GL Sciences Inc.). The resulting composition was further diluted by a factor of 3 with a 55 wt % sodium acetate solution to form a latent heat storage material. The resulting sample was evaluated by the method described above for evaluating the stability of supercooling. Table 1 shows the result.

Example B2

The heat storage material of Example B1 was diluted by a factor of 10 with a 55 wt % sodium acetate solution to form a latent heat storage material. The resulting sample was evaluated by the method described above for evaluating the stability of supercooling. Table 1 shows the result.

Example B3

The heat storage material of Example B2 was diluted by a factor of 10 with a 55 wt % sodium acetate solution to form a latent heat storage material. The resulting sample was evaluated by the method described above for evaluating the stability of supercooling. Table 1 shows the result.

Example B4

The heat storage material of Example B3 was diluted by a factor of 10 with a 55 wt % sodium acetate solution to form a heat storage material composition. The resulting sample was evaluated by the method described above for evaluating the stability of supercooling. Table 1 shows the result.

Example B5

The heat storage material of Example B4 was diluted by a factor of 100 with a 55 wt % sodium acetate solution to form a heat storage material composition. The resulting sample was evaluated by the method described above for evaluating the stability of supercooling. Table 1 shows the result.

TABLE 1

| | Sample No. | | | | | |
|---|---|---|---|---|---|---|
| | B1 | B2 | B3 | B4 | B5 | A1 |
| Ag concentration (ppm) | $5.0 \times 10^2$ | 50 | 5 | $5.0 \times 10^{-1}$ | $5.0 \times 10^{-3}$ | 0 |

TABLE 1-continued

|  | Sample No. | | | | | |
| --- | --- | --- | --- | --- | --- | --- |
|  | B1 | B2 | B3 | B4 | B5 | A1 |
| Probability (%) of remaining supercooled at −20° C. | 67 | 83 | 100 | 83 | 50 | 33 |

FIG. 1 shows a graph obtained by plotting the results in Table 1.

Comparative Example C1

Next, a study was conducted on how the addition of silver(I) oxide to a sodium acetate solution containing sodium acetate as a main component had an effect on the stability of supercooling. Specifically, the following procedure was carried out.

In a glass sample vial, a composition with a sodium acetate concentration of 55 wt % was prepared, the composition containing pure water and sodium acetate trihydrate (analytical grade) manufactured by Wako Pure Chemical Industries Ltd. In the preparation of the composition, the total weight of sodium acetate and water was 6.6 g, to which 30 wt % of silver(I) oxide was added. The resulting mixture was heated at 75° C. to give a latent heat storage material. The resulting sample was evaluated by the method described above for evaluating the stability of supercooling. Table 2 shows the result.

Example C2

A latent heat storage material was prepared and evaluated for the stability of supercooling in the same manner as in Example C1, except that silver(I) oxide was added in an amount of 10 wt %. Table 2 shows the result.

Example C3

A latent heat storage material was prepared and evaluated for the stability of supercooling in the same manner as in Example C1, except that silver(I) oxide was added in an amount of 5 wt %. Table 2 shows the result.

Example C4

A latent heat storage material was prepared and evaluated for the stability of supercooling in the same manner as in Example C1, except that silver(I) oxide was added in an amount of 1 wt %. Table 2 shows the result.

Example C5

A latent heat storage material was prepared and evaluated for the stability of supercooling in the same manner as in Example C1, except that silver(I) oxide was added in an amount of 0.7 wt %. Table 2 shows the result.

Example C6

A latent heat storage material was prepared and evaluated for the stability of supercooling in the same manner as in Example C1, except that silver(I) oxide was added in an amount of 0.3 wt %. Table 2 shows the result.

Example C7

A latent heat storage material was prepared by the same method as in Example C4. Subsequently, insoluble components were removed from the material using a filter with a pore size of 0.45 μm (model: 25AI, catalog number: 5040-28522, manufactured by GL Sciences Inc.), so that the latent heat storage material of this example was obtained. The resulting latent heat storage material was evaluated by the method described above for evaluating the stability of supercooling. Table 2 shows the result.

Example C8

The heat storage material of Example C7 was diluted by a factor of 4 with a 55 wt % sodium acetate solution to form a latent heat storage material. The resulting sample was evaluated by the method described above for evaluating the stability of supercooling. Table 2 shows the result.

Example C9

The heat storage material of Example C7 was diluted by a factor of 7 with a 55 wt % sodium acetate solution to form a latent heat storage material. The resulting sample was evaluated by the method described above for evaluating the stability of supercooling. Table 2 shows the result.

In addition, the same experiment was performed, except that the sodium acetate concentration was changed to 53 wt % and 57 wt %. The resulting latent heat storage materials also had a significantly higher probability of remaining supercooled than the latent heat storage material containing only sodium acetate and water.

TABLE 2

|  | Sample No. | | | | |
| --- | --- | --- | --- | --- | --- |
|  | C1 | C2 | C3 | C4 | C5 |
| Added amount (wt %) of $Ag_2O$ | 30 | 10 | 5 | 1 | 0.7 |
| Ag concentration (ppm) | $2.8 \times 10^5$ | $9.3 \times 10^4$ | $4.6 \times 10^4$ | $9.3 \times 10^3$ | $6.5 \times 10^3$ |
| Probability (%) of remaining supercooled at −20° C. | 25 | 50 | 100 | 100 | 100 |

|  | Sample No. | | | | |
| --- | --- | --- | --- | --- | --- |
|  | C6 | C7 | C8 | C9 | A1 |
| Added amount (wt %) of $Ag_2O$ | 0.3 | — | — | — | 0 |
| Ag concentration (ppm) | $2.8 \times 10^3$ | $3.0 \times 10^2$ | 75 | 43 | 0 |
| Probability (%) of remaining supercooled at −20° C. | 100 | 100 | 100 | 67 | 33 |

Figure 2:
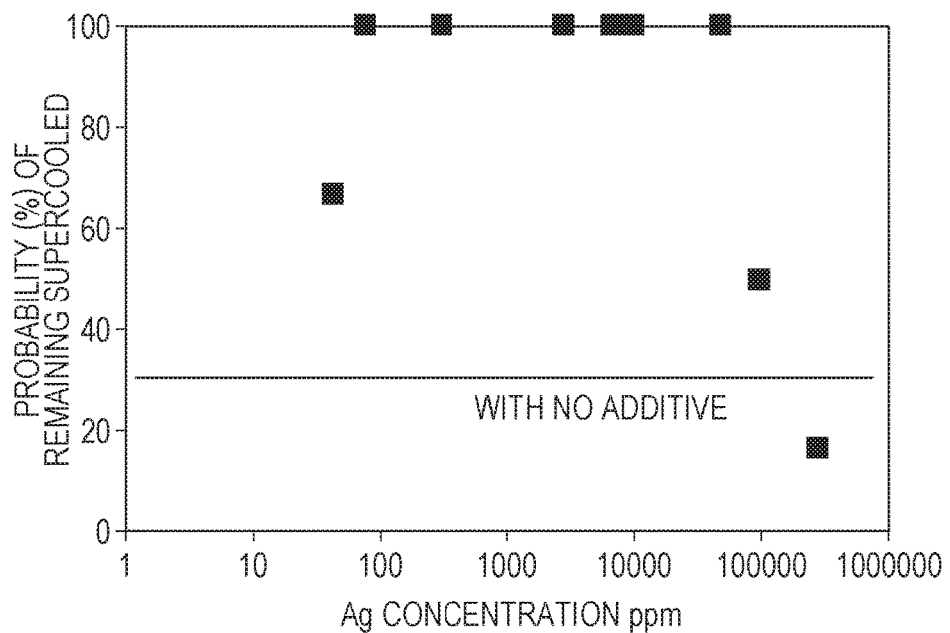
FIG. 2 is a graph showing a relationship between the probability (%) of a latent heat storage material according to the present disclosure remaining supercooled at −20° C. and the total silver concentration (ppm) of the latent heat storage material.

FIG. 2 shows a graph obtained by plotting the results in Table 2.

Example D1

Next, a study was conducted on how the addition of copper(II) chloride to a sodium acetate solution containing sodium acetate as a main component had an effect on the stability of supercooling. Specifically, the following procedure was carried out.

In a glass sample vial, a composition with a sodium acetate concentration of 55 wt % was prepared, the composition containing pure water and sodium acetate trihydrate (analytical grade) manufactured by Wako Pure Chemical Industries Ltd. In the preparation of the composition, the total weight of sodium acetate and water was 6.6 g, to which 30 wt % of copper(II) chloride was added. The resulting mixture was heated at 75° C. to give a latent heat storage material. The resulting sample was evaluated by the method described above for evaluating the stability of supercooling. Table 3 shows the result.

Example D2

A latent heat storage material was prepared and evaluated for the stability of supercooling in the same manner as in Example D1, except that copper(II) chloride was added in an amount of 10 wt %. Table 3 shows the result.

Example D3

A latent heat storage material was prepared and evaluated for the stability of supercooling in the same manner as in Example D1, except that copper(II) chloride was added in an amount of 5 wt %. Table 3 shows the result.

Example D4

A latent heat storage material was prepared and evaluated for the stability of supercooling in the same manner as in Example D1, except that copper(I) chloride was added in an amount of 3.5 wt %. Table 3 shows the result.

Example D5

A latent heat storage material was prepared and evaluated for the stability of supercooling in the same manner as in Example D1, except that copper(II) chloride was added in an amount of 2 wt %. Table 3 shows the result.

Example D6

A latent heat storage material was prepared and evaluated for the stability of supercooling in the same manner as in Example D1, except that copper(II) chloride was added in an amount of 1 wt %. Table 3 shows the result.

Example D7

A latent heat storage material was prepared and evaluated for the stability of supercooling in the same manner as in Example D1, except that copper(II) chloride was added in an amount of 0.7 wt %. Table 3 shows the result.

Example C8

A heat storage material composition was prepared by the same method as in Example D6. Subsequently, insoluble components were removed from the material using a filter with a pore size of 0.45 μm (model: 25AI, catalog number: 5040-28522, manufactured by GL Sciences Inc.), so that a latent heat storage material was obtained. The resulting sample was evaluated by the method described above for evaluating the stability of supercooling. Table 3 shows the result.

Example D9

The heat storage material of Example D8 was diluted by a factor of 33 with a 55 wt % sodium acetate solution to form a latent heat storage material. The resulting sample was evaluated by the method described above for evaluating the stability of supercooling. Table 3 shows the result.

Example D10

The heat storage material of Example D9 was diluted by a factor of 100 with a 55 wt % sodium acetate solution to form a latent heat storage material. The resulting sample was evaluated by the method described above for evaluating the stability of supercooling. Table 3 shows the result.

Example D11

The heat storage material of Example D10 was diluted by a factor of 100 with a 55 wt % sodium acetate solution to form a heat storage material composition. The resulting sample was evaluated by the method described above for evaluating the stability of supercooling. Table 3 shows the result,

TABLE 3

|  | Sample No. | | | | | |
| --- | --- | --- | --- | --- | --- | --- |
|  | D1 | D2 | D3 | D4 | D5 | D6 |
| Added amount (wt %) of $CuCl_2$ | 30 | 10 | 5 | 3.5 | 2 | 1 |
| Cu concentration (ppm) | $1.4 \times 10^5$ | $4.7 \times 10^4$ | $2.4 \times 10^4$ | $1.7 \times 10^4$ | $9.4 \times 10^3$ | $4.7 \times 10^3$ |
| Probability (%) of remaining supercooled at −20° C. | 50 | 100 | 100 | 100 | 100 | 100 |

|  | Sample No. | | | | | |
| --- | --- | --- | --- | --- | --- | --- |
|  | D7 | D8 | D9 | D10 | D11 | A1 |
| Added amount (wt %) of $CuCl_2$ | 0.7 | — | — | — | — | 0 |
| Cu concentration (ppm) | $3.3 \times 10^3$ | $1.4 \times 10^3$ | $4.1 \times 10^{-1}$ | $4.1 \times 10^{-4}$ | $4.1 \times 10^{-5}$ | 0 |
| Probability (%) of remaining supercooled at −20° C. | 100 | 100 | 100 | 100 | 67 | 33 |

Figure 3:
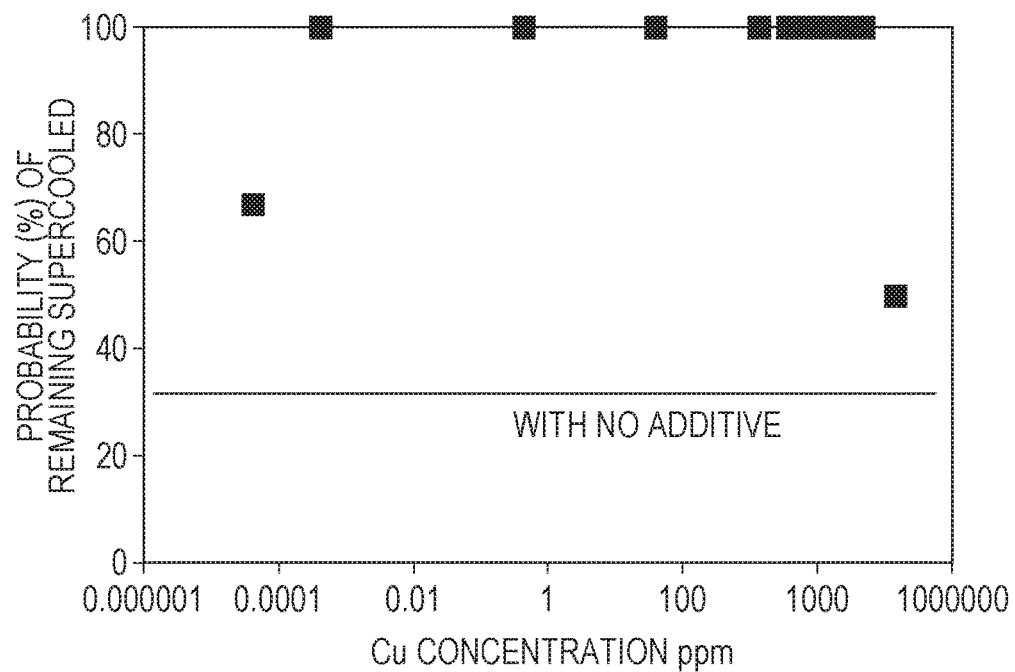
FIG. 3 is a graph showing a relationship between the probability (%) of a latent heat storage material according to the present disclosure remaining supercooled at −20° C. and the total copper concentration (ppm) of the latent heat storage material.

FIG. 3 shows a graph obtained by plotting the results in Table 3.

Comparative Example E1

Next, a study was conducted on how the addition of copper(II) oxide to a sodium acetate solution containing sodium acetate as a main component had an effect on the stability of supercooling. Specifically, the following procedure was carried out.

In a glass sample vial, a composition with a sodium acetate concentration of 55 wt % was prepared, the composition containing pure water and sodium acetate trihydrate (analytical grade) manufactured by Wako Pure Chemical Industries Ltd. In the preparation of the composition, the total weight of sodium acetate and water was 6.6 g, to which 30 wt % of copper(II) oxide was added. The resulting mixture was heated at 75° C. to give a latent heat storage material. The resulting sample was evaluated by the method described above for evaluating the stability of supercooling. Table 4 shows the result.

Example E2

A latent heat storage material was prepared and evaluated for the stability of supercooling in the same manner as in Example E1, except that copper(II) oxide was added in an amount of 5 wt %. Table 4 shows the result.

Example E3

A latent heat storage material was prepared and evaluated for the stability of supercooling in the same manner as in Example E1, except that copper(II) oxide was added in an amount of 1 wt %. Table 4 shows the result.

Example E4

A latent heat storage material was prepared and evaluated for the stability of supercooling in the same manner as in Example E1, except that copper(II) oxide was added in an amount of 0.7 wt %. Table 4 shows the result.

Example E5

A latent heat storage material was prepared and evaluated for the stability of supercooling in the same manner as in Example E1 except that copper(II) oxide was added in an amount of 0.3 wt %. Table 4 shows the result.

Example E6

A latent heat storage material was prepared and evaluated for the stability of supercooling in the same manner as in Example E1, except that copper(II) oxide was added in an amount of $8.0 \times 10^{-2}$ wt %. Table 4 shows the result.

Example E7

A latent heat storage material was prepared by the same method as in Example E4. Subsequently, insoluble components were removed from the material using a filter with a pore size of 0.45 μm (model: 25AI, catalog number: 5040-28522, manufactured by GL Sciences Inc.), so that a latent heat storage material was obtained. The resulting latent heat storage material was evaluated by the method described above for evaluating the stability of supercooling. Table 4 shows the result.

Example E8

The heat storage material of Example E7 was diluted by a factor of 4 with a 55 wt % sodium acetate solution to form a latent heat storage material. The resulting sample was evaluated by the method described above for evaluating the stability of supercooling. Table 4 shows the result.

Example E9

The heat storage material of Example E7 was diluted by a factor of 7 with a 55 wt % sodium acetate solution to form a latent heat storage material. The resulting sample was evaluated by the method described above for evaluating the stability of supercooling. Table 4 shows the result.

TABLE 4

|  | Sample No. | | | | |
| --- | --- | --- | --- | --- | --- |
|  | E1 | E2 | E3 | E4 | E5 |
| Added amount (wt %) of CuO | 30 | 5 | 1 | 0.7 | 0.3 |
| Cu concentration (ppm) | $2.4 \times 10^5$ | $4.0 \times 10^4$ | $8.0 \times 10^3$ | $5.6 \times 10^3$ | $2.4 \times 10^3$ |
| Probability (%) of remaining supercooled at −20° C. | 0 | 100 | 100 | 100 | 100 |

|  | Sample No. | | | | |
| --- | --- | --- | --- | --- | --- |
|  | E6 | E7 | E8 | E9 | A1 |
| Added amount (wt %) of CuO | $8.0 \times 10^{-2}$ | — | — | — | 0 |
| Cu concentration (ppm) | $6.4 \times 10^2$ | $4.6 \times 10^{-1}$ | $1.2 \times 10^{-1}$ | $6.6 \times 10^{-2}$ | 0 |
| Probability (%) of remaining supercooled at −20° C. | 100 | 100 | 100 | 100 | 33 |

Figure 4:
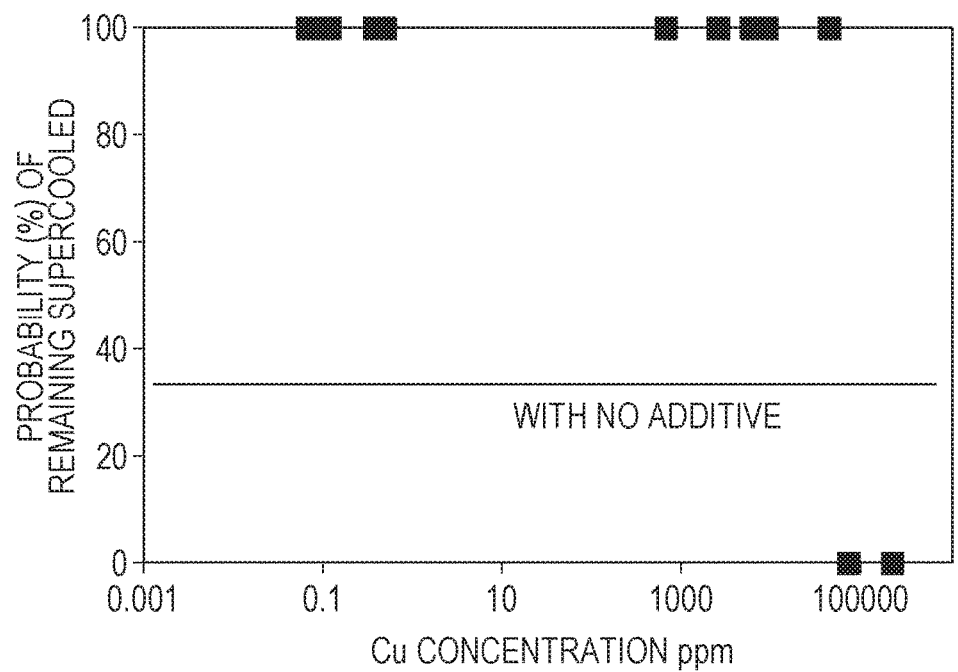
FIG. 4 is a graph showing a relationship between the probability (%) of a latent heat storage material according to the present disclosure remaining supercooled at −20° C. and the total copper concentration (ppm) of the latent heat storage material.

FIG. 4 shows a graph obtained by plotting the results in Table 4.

In addition, the same experiment was performed, except that the sodium acetate concentration was changed to 53 wt % and 57 wt %. The resulting latent heat storage materials also had a significantly higher probability of remaining supercooled than the latent heat storage material containing only sodium acetate and water.

The latent heat storage material according to the present disclosure can be used in a variety of thermal storage devices or systems. Specifically, the heat storage material composition according to the present disclosure can stably maintain its supercooled state even in a low-temperature environment at −20° C., such as a cold district. Therefore, for example, the heat storage material composition according to the present disclosure can be advantageously used in heat storage devices that use, as a heat source, waste heat from vehicle internal combustion engines or boilers. In addition, the latent heat storage material according to the present disclosure can work even when its supercooling stabilizer content is very small. Therefore, the latent heat storage material according to the present disclosure can stably maintain its supercooled state in a low-temperature environment at −20° C. without being reduced in heat storage density. Also from this point, the latent heat storage material according to the present disclosure is suitable for heat storage devices that use, as a heat source, waste heat from vehicle internal combustion engines or boilers.

What is claimed is:

1. A latent heat storage material comprising:
sodium acetate;
water; and
a supercooling stabilizer,
wherein the supercooling stabilizer includes silver (I) nitrate, and
the concentration of the silver (I) nitrate is not less than $5.0 \times 10^{-3}$ ppm and not more than $2.0 \times 10^3$ ppm.

2. A latent heat storage material comprising:
sodium acetate;
water; and
a supercooling stabilizer,
wherein the supercooling stabilizer includes silver (I) oxide, and
the concentration of the silver (I) oxide is not less than 40 ppm and not more than $1.0 \times 10^5$ ppm.

3. A latent heat storage material comprising:
sodium acetate;
water; and
a supercooling stabilizer,
wherein the supercooling stabilizer includes copper (II) oxide, and
the concentration of the copper (II) oxide is not less than $5.0 \times 10^{-2}$ ppm and not more than $6.0 \times 10^4$ ppm.

* * * * *